June 4, 1968  J. R. KATCHKA  3,386,467

FLOW CONTROL AND REGULATING SYSTEM

Filed Oct. 24, 1965

INVENTOR
JAY R. KATCHKA

BY Anthony A. O'Brien

ATTORNEY

United States Patent Office 3,386,467
Patented June 4, 1968

3,386,467
FLOW CONTROL AND REGULATING SYSTEM
Jay R. Katchka, Long Beach, Calif., assignor to Robertshaw Controls Company, Richmond, Va., a corporation of Delaware
Filed Oct. 24, 1965, Ser. No. 504,816
11 Claims. (Cl. 137—495)

The present invention relates to flow control and pressure regulating systems, and, in particular, to such a system having diaphragm operated means providing on-off control of gas flow to the main burner of a heating device as well as regulation of the gas pressure to the main burner.

An object of the present invention is to eliminate flutter or fluctuations of a diaphragm operated valve in a regulating position.

Another object of this invention is to hinge a diaphragm operated valve member for pivotal movement between on-off positions and regulating positions.

This invention has another object in that a flow control and pressure regulating system is operated by a single hinged valve assembly.

The present invention has another object in that a hinged valve assembly accurately follows the movement of a diaphragm operation in a flow control and pressure regulating device.

A further object of this invention is to operate a hinged valve assembly by diaphragm means responsive to the pressure of a bleed line which includes on-off and regulating bleed controls.

In practicing this invention, a flow control and pressure regulating system is characterized by a casing having inlet and outlet means, differential pressure operated valve means disposed between the inlet and outlet means, a bleed line in the casing maintaining the differential pressure for operating the valve means, means controlling and regulating the bleed line whereby the valve means is moved between on-off positions and regulating positions, and spring means on the valve means to eliminate flutter or fluctuations thereof while in a regulating position.

Other objects and advantages of the present invention will become apparent from the following description of a preferred embodiment taken in connection with the accompanying drawing wherein.

Figure 2:
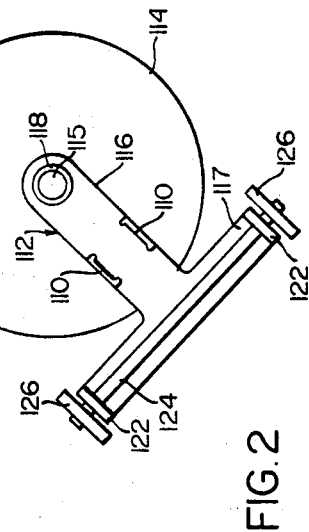
FIG. 2 is a plan view of a detail of FIG. 1.
Figure 1:
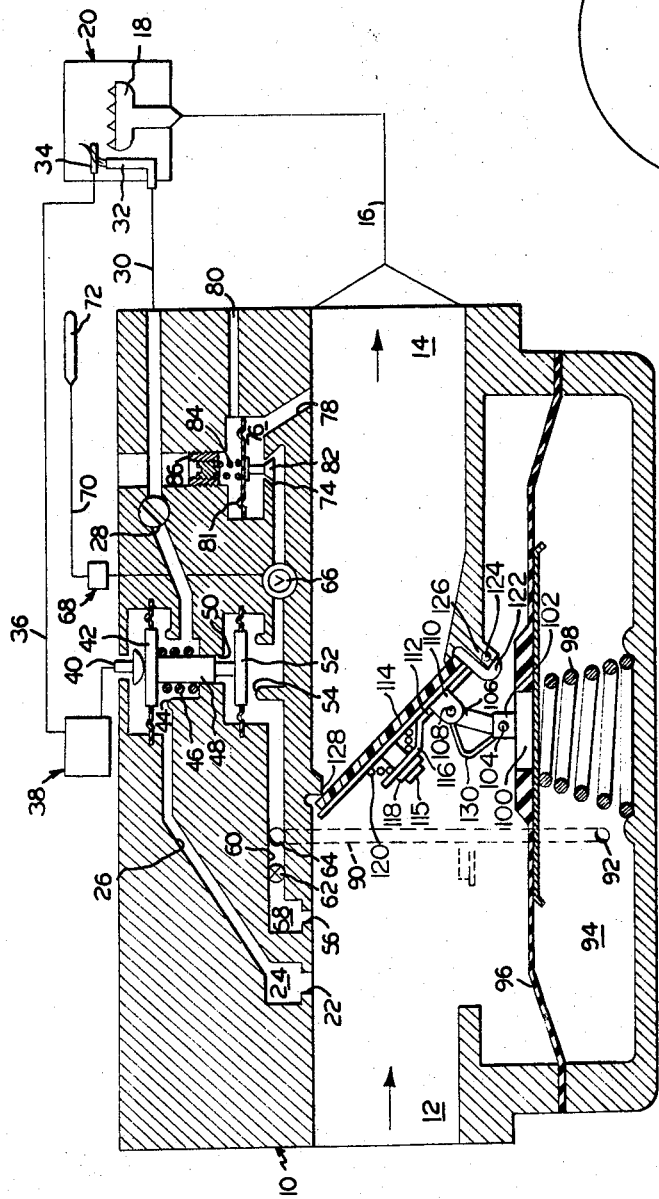
FIG. 1 is a schematic diagram with parts in section of a gas flow control system embodying the present invention.
Figure 3:
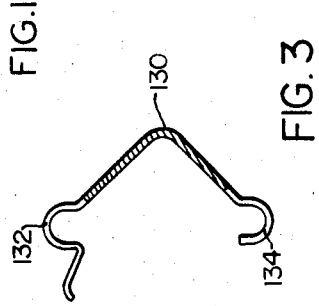
FIG. 3 is a cross section of a detail of FIG. 1.

With reference to FIG. 1 of the drawing, a control device casing, indicated generally at 10, has an inlet passage 12 and an outlet passage 14 which are diametrically opposite and coaxial to define a straight through bore. The inlet 12 is connected to any suitable gas source (not shown) and the outlet 14 is connected to a conduit 16 for delivering a gas flow to the main burner 18 of a heating device, indicated generally at 20.

In communication with the inlet passage 12, a bypass pilot flow port 22 in the casing 10 defines an inlet for a filter cavity 24, the outlet of which communicates with a bypass pilot flow passage 26. An adjustable flow restrictor 28 is disposed in the bypass pilot flow passage 26 adjacent its outlet which is connected to a conduit 30 for delivering a pilot flow of gas to the pilot burner 32 which is located in igniting proximity to the main burner 18. A flame responsive device, such as a thermocouple 34, is disposed in the flame of the pilot burner 32 and is connected by a lead cable 36 to an electromagnetic holding device 38 of any conventional type. The holding device 38 conventionally includes an electromagnet and valve actuator 40 which holds the valve member 42 in an open position as long as there is a flame at the pilot burner 32. Electromagnetic holding devices of this type are well known in the art and a detached description thereof is excluded for the sake of brevity.

The valve member 42 includes a diaphragm type seal and cooperates with a valve seat 44 formed in the bypass pilot flow passage 26 upstream of the flow restrictor 28. A coil spring 46 encircles a valve stem 48 and is mounted in compression between an internal wall portion of the casing 10 and the undersurface of the valve member 42 which is thus biased to an open position. The valve stem 48 extends through a bore 50 in the casing 10 and on its lower end carries another valve 52 which includes a diaphragm type seal and which cooperates with a fixed valve seat 54.

Spaced from the bypass pilot flow port 22 and in communication with the inlet passage 12, a bleed flow port 56 in the casing 10 defines an inlet for a filter cavity 58, the outlet of which communicates with a bleed flow passage 60. Adjacent the filter cavity 58, the bleed flow passage is provided with a flow restrictor 62. As is shown in FIG. 1, the valve seat 54 is formed in the bleed flow passage 60 which also has a two way port 64 located between the flow restrictor 62 and the valve seat 54.

Downstream of the valve seat 54, the bleed flow passage 60 is controlled by a thermostatically operated valve 66 that is moved between a plurality of controlling positions by a thermally responsive operator 68. The operator 68 may be of any suitable type such as a bellows (not shown) that communicates with a capillary tube 70 having a thermally responsive bulb 72 on its other end. The bellows in the operator 68, the capillary tube 70 and the thermal sensing bulb 72 comprises a closed system filled with a thermally expansible fluid so that a variation of temperature sensed by the bulb 68 produces a corresponding expansion and contraction of the bellows. The bulb 72 is located in a space being heated by the heating device 20 and the operator 68 includes a snap acting mechanism (not shown) for operating the valve 66 between on and off positions as determined by any suitable form of temperature setting means (not shown).

Downstream of the thermostatically operated valve 66, the bleed passage terminates in a valve seat 74 leading to a pressure regulating chamber 76 which in turn communicates with a bleed flow outlet 78 leading to the main flow outlet passage 14. An atmospheric vent passage 80 vents the space above a pressure regulating diaphragm 81, the undersurface of which responds to the pressure of the bleed flow in the chamber 76. A pressure regulating valve 82 is carried by the the flexible diaphragm 81. The upper surface of the diaphragm 81 is biased by a coil spring 84 mounted in compression between the diaphragm 81 and an adjustable plug 86 threaded into a suitable opening in the casing 10.

The bleed flow passage 60 has a parallel path in the form of a passageway 90 extending from the two way bleed port 64 to a port 92 opening into a main pressure chamber 94 defined by the lower wall of casing 10 and a flexible diaphragm 96. A coil spring 98 in the chamber 94 is mounted in compression between the lower wall of casing 10 and the back-up plate centrally fixed to the undersurface of the diaphragm 96. The upper surface of the main diaphragm 96 has a central mounting plate 100 carrying a pair of spaced, upwardly extending lugs 102 (only one being shown) that carry a pivoting axle 104 therebetween. A connecting link 106 with one end attached to axle 104 has its other end attached to a similar axle 108 mounted between a pair of lugs 110 extending perpendicularly from the central leg of a T-shaped lever 112 that carries a valve disc member 114.

The central leg 116 of the valve carrying lever 112 has an offset end which is apertured to receive the valve stem 115; a lock washer 118 retains the valve stem 115 on the lever leg 116 and a helical coil spring 120 is mounted in compression between the offset lever leg 116 and the back-up plate of the valve disc 114. Thus, the valve disc 164 is provided with a universal type mount which avoids valve biasing and permits it to pivot in all directions for a better closure action. The base leg 117 of the lever 112 has a perpendicularly extending lug 122 on each end. A pivotal axle 124 extends through the lugs 122 with the axle ends being mounted in bearing blocks 126 integrally formed in internal wall portions of the casing 10. The straight through bore between inlet 12 and outlet 14 is provided with an annular valve seat 128 integrally formed in an internal wall portion of casing 10 in a slanted manner whereby the valve member 114 moves through an acute angle relative to the slanted valve seat 128. A leaf spring 130 having a generally L-shaped cross-section has an undulated end portion 132 extending under the axle 108 with its terminus biased into engagement with the lever leg 116; an opposite end 134 of the L-shaped spring is being under the axle 104 between the lugs 102. The leaf spring ends 132 and 134 are bifurcated to straddle the ends of the connecting link 106.

*Operation*

In order to place the control system of FIG. 1 in operation, a supply of gas is fed to inlet 12 as by opening a shut-off cock (not shown). A bypass pilot flow of gas flow through the pilot flow inlet 22, the filter cavity 24, the passage 26, the open valve seat 44, the flow restrictor 28 and the conduit 30 to the pilot burner 32 where it is ignited as by a match. During the lighting of the pilot burner 30, the manual reset means on the holding device 38 is depressed whereby the operator 40 and the valve member 42 is biased upwardly to an opened position by the spring 46; as soon as the thermocouple 34 is heated, the manual reset means may be released and the energized electromagnet holds the operator 40 and the valve member 42 in its opened position.

A bleed of gas flows from the inlet 12 through the bleed port 56, the filter cavity 58 and the flow restrictor 62 into the bleed flow passage 60, thence through the two way port 64, the passageway 90 and the port 92 into the pressure chamber 94. Thus the main flow valve 114 is closed against its seat 128 because the main diaphragm 96 is biased towards its closed position by the coil spring 96 whenever the pressure in chamber 94 and the inlet pressure on the upper surface of diaphragm 96 are equal. The equalization of the differential pressures occurs whenever the bleed flow passage 60 is closed downstream of the two way port 64. For example, whenever the valve 66 is closed in response to a satisfied heat condition, the bleed flow is cut off and the main valve 114 is closed; such is the condition illustrated by the controlling positions of the components in FIG. 1.

Assuming now that the bulb 72 senses a demand for heat, the valve 66 is opened and the bleed flow proceeds from the flow restrictor 62 through the bleed passage 60, the opened safety valve seat 54, the valve 66, the regulating valve seat 74, the pressure regulating chamber 76 and the bleed outlet 78 to the main outlet 14. During such flow through the bleed passage 60, the gas in the main pressure chamber 94 is bled off and the inlet pressure on the upper surface of diaphragm 96 causes the main valve 114 to open whereby a main flow of gas to the main burner 18 is ignited by the flame at the pilot burner 32. It is now apparent that the valve 66 is cycled thermostatically to open and close the bleed flow line and effect corresponding opening and closing of the main flow line.

During the times when the thermostatically operated valve is opened, the bleed flow is regulated by the small pressure regulating valve 82. The valve 82 is biased away from the valve seat 74 by the coil spring 84 and the pressure of the bleed flow acts on the undersurface of diaphragm 81 whereby the valve 82 seeks its predetermined regulating position. Regulation of the bleed flow effects a corresponding regulation of the pressure in the pressure chamber 94 so that the main valve 114 is provided with a regulatory movement.

In the event the flame at the pilot burner 32 is extinguished, the thermocouple 34 is cooled and the electromagnetic holding device 38 is deenergized causing a downward movement of the actuator 40 whereby the pilot safety valve 42 is closed on its seat 44 and the bleed line interrupter valve 52 is closed on its seat 54. Accordingly, all gas flows are cut off since closure of the bleed line pressurizes the pressure chamber 94 to close the main valve 114. To commence operation, the resetting means must be operated as described above for igniting the pilot burner 32. A safe lighting feature may be incorporated in the resetting means of the electromagnetic holding device 38 whereby the valves 42 and 52 are provided with relative movement during reset so that only the bypass pilot flow passage is opened; the safe lighting feature may alternatively be incorporated in the gas cock (not shown) by means of a pilot position wherein only pilot port 22 is connected to the gas source.

As is illustrated in dashed lines FIG. 1, the open position of the valve 114 defines a straight through flow passage for main burner gas resulting in additional flow capacity and less pressure drop across the control device casing. The movement of the diaphragm 96 is transmitted to the valve member 114 by the link 106 and its pivoting end axles 104 and 108; i.e., when the chamber 94 is depressurized, the valve 114 and lever 112 pivot counterclockwise (FIG. 1) about the hinged axle 124. The leaf spring 130 stabilizes movement of the hinged valve assembly and takes up any play or slack between the diaphragm 96 and the valve 114; with such an arrangement flutter of the valve member during pressure regulation is virtually eliminated. The overall configuration of the leaf spring 126 is generally L-shaped which is bowed into its assembled position to exert continuous biasing forces on the diaphragm plate 100 and on the valve lever 112.

Inasmuch as the preferred embodiment of the present invention is subject to many modifications, variations and changes in detail, it is intended that all matter contained in the foregoing description or shown on the accompanying drawing shall be interpreted as illustrative and not in a limiting sense.

What is claimed is:

1. In a flow control and pressure regulating system, the combination comprising,
   a casing having inlet and outlet means,
   valve means pivotally mounted in said casing between said inlet and outlet means,
   diaphragm means connected to said valve means for moving the same between on-off positions and regulating positions,
   a bleed line in said casing controlling an operating pressure on said diaphragm means,
   means controlling and regulating said bleed line to vary the operating pressure on said diaphragm means whereby said valve means is pivoted between on-off positions and regulating positions, and
   spring means disposed between said valve means and said diaphragm means to stabilize movement of said valve means.

2. The combination as recited in claim 1 wherein a link member connects said diaphragm means and said valve means.

3. The combination as recited in claim 2 wherein pivotal means pivotally connects one end of said link member to said diaphragm means and the other end of said link member to said valve means.

4. The combination as recited in claim 3 wherein said spring means comprises a bowed leaf spring retained by said pivotal means and having one end biasing said diaphragm means and another end biasing said valve means.

5. In a flow control and pressure regulating system, the combination comprising, a casing having inlet and outlet means, valve means pivotally mounted in said casing between said inlet and outlet means, a diaphragm operator pivotally connected to said valve means for moving the same between on-off positions and regulating positions, a bleed line in said casing controlling an operating pressure on said diaphragm operator, a plurality of means controlling and regulating said bleed line to vary the operating pressure on said diaphragm operator whereby said valve means is pivoted between on-off positions and regulating positions, and leaf spring means biased between said valve means and said diaphragm means to stabilize movement of said valve means.

6. The combination as recited in claim 5 wherein said plurality of means comprising interrupting safety valve means movable between on-off positions, thermostatically operated valve means movable between on-off positions, and pressure regulating valve means movable between regulating positions.

7. The combination as recited in claim 6 wherein said thermostatically operated valve means is downstream of said safety valve means and upstream of said pressure regulating valve means.

8. The combination as recited in claim 7 wherein said casing includes a bypass pilot flow passage and said safety valve means includes a resettable safety control device controlling said bypass pilot flow passage.

9. In a flow control and pressure regulating device, the combination comprising a casing having inlet and outlet means and a valve seat therebetween, a valve member pivotally mounted in said casing for movement relative to said valve seat, a pressure responsive diaphragm pivotally connected to said valve member for moving the same between on-off and regulating positions, a bleed line for maintaining an operating pressure on said diaphragm, valve means controlling said bleed line to control the operating pressure on said diaphragm and effect movement of said valve member between on-off positions, pressure regulating valve means regulating said bleed line to regulate the operating pressure on said diaphragm and effect regulating movement of said valve member, a leaf spring mounted in a bowed condition between said valve member and said diaphragm whereby said valve member accurately follows movement of said diaphragm.

10. The combination as recited in claim 9 wherein a link member has pivot axles on opposite ends with one axle being pivoted to said valve member and the other axle being pivoted to said diaphragm.

11. The combination as recited in claim 10 wherein said inlet and outlet means define a straight through flow passage, said valve seat is inclined at an acute angle in such flow passage, and said valve member is pivoted through such acute angle to its regulating position whereby flow from said inlet means to said outlet means proceeds with minimal pressure drop.

References Cited

UNITED STATES PATENTS

| | | | |
|---|---|---|---|
| 2,333,775 | 11/1943 | Gille | 137—495 |
| 2,704,648 | 3/1955 | Cobb | 251—61 |

M. CARY NELSON, *Primary Examiner.*

A. ROSENTHAL, *Assistant Examiner.*